US009097267B2

(12) United States Patent
Eide et al.

(10) Patent No.: US 9,097,267 B2
(45) Date of Patent: Aug. 4, 2015

(54) PRESSURE INTENSIFIER SYSTEM FOR SUBSEA RUNNING TOOLS

(75) Inventors: Jorgen Eide, Fana (NO); Anders Brunvold, Blomsterdalen (NO); Arne Veland, Bergen (NO)

(73) Assignee: Framo Engineering AS, Bergen (NO)

( * ) Notice: Subject to any disclaimer, the term of this patent is extended or adjusted under 35 U.S.C. 154(b) by 0 days.

(21) Appl. No.: 13/394,207

(22) PCT Filed: Oct. 22, 2010

(86) PCT No.: PCT/EP2010/065974

§ 371 (c)(1), (2), (4) Date: May 14, 2012

(87) PCT Pub. No.: WO2011/048213

PCT Pub. Date: Apr. 28, 2011

(65) Prior Publication Data

US 2012/0216889 A1 Aug. 30, 2012

(30) Foreign Application Priority Data

Oct. 23, 2009 (NO) .................................... 20093202

(51) Int. Cl.
*F16K 17/36* (2006.01)
*F15B 1/24* (2006.01)
(Continued)

(52) U.S. Cl.
CPC ............... *F15B 1/24* (2013.01); *E21B 33/0355* (2013.01); *F15B 1/024* (2013.01)

(58) Field of Classification Search
CPC .......... F15B 3/00; F15B 1/24; F15B 2201/31; F15B 1/024; E21B 33/035; E21B 33/0355
USPC ........................................................ 137/81.2
See application file for complete search history.

(56) References Cited

U.S. PATENT DOCUMENTS 3,436,914 A * 4/1969 Rosfelder ........................ 60/398
3,677,001 A 7/1972 Childers et al.
(Continued)

FOREIGN PATENT DOCUMENTS

WO WO 2008/096170 8/2008

OTHER PUBLICATIONS

International Search Report for corresponding International Patent Application PCT/EP2010/065974 mailed Aug. 9, 2011.
(Continued)

*Primary Examiner* — Craig Schneider
*Assistant Examiner* — Frederick D Soski
(74) *Attorney, Agent, or Firm* — Merchant & Gould P.C.

(57) ABSTRACT

A system to pressurize barrier fluid of a submersible installation to provide a differential pressure between the ambient pressure surrounding the submersible installation and the pressure of the barrier fluid internally in the submersible installation during submersion of the system, wherein the differential pressure fits within a predetermined differential pressure range. The system comprises a pre-charge arrangement and a pressure intensifier which is adapted to start working at a start-up pressure. The pre-charge arrangement is adapted, during submerging of the system, to provide a differential pressure within the predetermined differential pressure range until the ambient pressure equals the start up pressure of the pressure intensifier, while the pressure intensifier is adapted to provide a differential pressure within the predetermined differential pressure range when the ambient pressure equals the start-up pressure of the pressure intensifier during further submersion of the system.

10 Claims, 3 Drawing Sheets

(51) Int. Cl.
*E21B 33/035* (2006.01)
*F15B 1/02* (2006.01)

(56) References Cited

U.S. PATENT DOCUMENTS

| | | | | |
|---|---|---|---|---|
| 3,918,498 | A * | 11/1975 | Schneider | 138/31 |
| 3,987,708 | A | 10/1976 | Uhrich | |
| 4,649,704 | A | 3/1987 | Marsh | |
| 4,777,800 | A * | 10/1988 | Hay, II | 60/593 |
| 5,971,027 | A | 10/1999 | Beachley et al. | |
| 6,192,680 | B1 * | 2/2001 | Brugman et al. | 60/398 |
| 6,202,753 | B1 | 3/2001 | Baugh | |
| 6,418,970 | B1 * | 7/2002 | Deul | 138/31 |
| 7,424,917 | B2 * | 9/2008 | Martin | 166/335 |
| 8,087,424 | B2 * | 1/2012 | Swartzentruber et al. | 137/81.1 |
| 8,156,953 | B2 * | 4/2012 | Tveita | 137/12 |
| 8,196,598 | B2 * | 6/2012 | Liberale et al. | 137/81.2 |
| 8,464,525 | B2 * | 6/2013 | Springett et al. | 60/398 |
| 2003/0037544 | A1 * | 2/2003 | Armstrong | 60/413 |
| 2008/0104951 | A1 | 5/2008 | Springett | |
| 2008/0185046 | A1 * | 8/2008 | Springett et al. | 137/14 |

OTHER PUBLICATIONS

Norwegian Search Report for corresponding Norwegian Patent Application 20093202 mailed May 21, 2010.

International Preliminary Report on Patentability for corresponding International Patent Application PCT/EP2010/065974.

Written Opinion of the International Searching Authority for corresponding International Patent Application No. PCT/EP2010/065974.

* cited by examiner

PRESSURE INTENSIFIER SYSTEM FOR SUBSEA RUNNING TOOLS

This application is a National Stage Application of PCT/EP2010/065974, filed 22 Oct. 2010, which claims benefit of Serial No. 20093202, filed 23 Oct. 2009 in Norway and which applications are incorporated herein by reference. To the extent appropriate, a claim of priority is made to each of the above disclosed applications.

The present invention concerns a system to pressurize barrier fluid of a submersible installation during descent when the submersible installation is being installed and ascent when the submersible installation is retrieved from its submersed installation position, usually on the seabed. The present invention also comprises a method for pressurizing the barrier fluid during installation and retrieval and a use of the system.

The submersible installation may be a subsea pump, subsea compressor or a control pod or other equipment, having components in its interior which needs to be protected from ambient pressure and water intrusion. Such equipment is often arranged with a barrier fluid arrangement comprising a seal arrangement and a barrier fluid for sealing off the interior of the subsea installation.

When a subsea pump is being installed, it is crucial that the barrier fluid pressure is higher than ambient pressure in order to eliminate any risk of water intrusion. The pressure of the barrier fluid needs to be controlled and regulated to make sure it is higher than the ambient pressure to prevent water intrusion. The interior of the submersible installation is then to be protected in the various installation depths and also during submerging and retrieval with the ambient pressure varying in accordance with the water depth. By provision of an over pressure in the barrier fluid a differential pressure is obtained between the ambient pressure surrounding the submersible installation and the pressure of the barrier fluid. On the other hand, there is a limit on how large pressures differentials the dynamic seals and O-rings inside the pump can endure against surrounding pressures. The practice today is to use a maximum of 200 barg. The size of the differential pressure is therefore predetermined and may vary according to the field of use.

In accordance with prior art solutions, the barrier fluid arrangement has been connected to accumulators to compensate for changes in the volume of the barrier fluid due to the ambient pressure and temperature. When the submersible installation is located at deep water, such as for instance between 1600 m to 3000 m, accumulators are insufficient in providing the necessary pressure difference between the ambient pressure and the barrier fluid.

As there is a need for subsea installations to be installed at locations in deep water, it is an object of this invention to provide a solution which is capable of keeping the differential pressure between the ambient pressure and pressure of the barrier fluid at an acceptable level during descent, ascent and at the installation location.

The system in accordance with the invention as defined in the independent claim fulfils this demand, and the embodiments of the invention is defined in the dependent claims.

In accordance with the invention there is provided a system to pressurize barrier fluid of a submersible installation to maintain a differential pressure between the ambient pressure surrounding the submersible installation and the pressure of the barrier fluid internally in the submersible installation, especially during submersion of the system, where the differential pressure fits within a predetermined differential pressure range between the ambient pressure surrounding the submerged installation and the pressure of the barrier fluid internally in the submerged installation. The pressure difference provided by the system depends on the ambient pressure, and as the ambient pressure increases, the pressure difference also increases.

The differential pressure delivered by the system will vary somewhat due to the ambient pressure, but the system is dimensioned so that the differential pressure fits within a predetermined pressure range acceptable to the system, both at the location of installation and also during the submerging and retrieval process.

The system comprises a pre-charge arrangement and at least one pressure intensifier. For the pressure intensifier to start working and provide a necessary over pressure in the barrier fluid, the ambient pressure needs to be of a certain size. The system needs to be submerged at a certain depth before the ambient pressure is of a size which matches the specific start up pressure of the pressure intensifier. When the ambient pressure equals the start up pressure of the pressure intensifier, the at least one pressure intensifier uses the ambient pressure to provide a differential pressure which fits within the predetermined differential pressure range. The pressure intensifier works proportionally to the ambient pressure, and when the ambient pressures increases or decreases the pressure delivered from the pressure intensifier increases or decreases proportionally.

When the ambient pressure at the start up of the system is at a lower level than the start up pressure of the pressure intensifier, for instance when introducing the submersible installation into the water and submerging it an initial water depth, the pre-charge arrangement compensates for any temperature changes and provides the predetermined differential pressure until the start up pressure of the pressure intensifier is reached, for instance when the subsea installation has been submerged to a certain depth. When the start up pressure of the pressure intensifier is met, the at least one pressure intensifier provides the predetermined differential pressure.

The system could be arranged so that the pre-charged arrangement and the at least one pressure intensifier work successively or could be arranged so that only the pre charged arrangement or the at least one pressure intensifier is utilized to pressurize the barrier fluid. The use of the pre-charged arrangement and the at least one pressure intensifier successively and the use of the pre charged arrangement or the at least one pressure intensifier depend on the water depth wherein the system is applied, and also of the procedure to be carried out. When submerging the system from the water surface the pre-charged arrangement will take care of the pressurizing of the barrier fluid at an initial phase, and the at least one pressure intensifier thereafter. When the system is used in a restricted water depth, only the pre-charged arrangement may be needed for pressurizing of the barrier fluid. When the system is used upon a subsea installation, the barrier fluid of the subsea installation will expand during ascent due to reduced ambient pressure and increasing temperature. The pressure intensifier is therefore prepared in advance such that it is capable of receiving barrier fluid as the barrier fluid expands in order to avoid excessive overpressure in the barrier fluid. During the retrieving operation, only the pressure intensifier may be needed for pressurizing of the barrier fluid during the ascent to the surface. However, the system is preferably provided with at least one valve which can be opened such that barrier fluid may also flow back to the accumulators if necessary.

The pre-charged arrangement may comprise at least one accumulator. In one embodiment two accumulators are included in the system. As the skilled person will understand the pre-charged accumulators could also be substituted by other devices such as an internal helical spring or a bellow compensator in stretch.

The main challenge with an internal helical spring or a bellow compensator in stretch is to have sufficient force for the interval of movement. The magnitude of movement may be at its most when equipment is lowered into the sea due to the temperature change. In one embodiment the use of accumulator(s) in combination with the pressure intensifier are favourable in the initial installation phase especially due to many tuning possibilities for accumulator pre-charge.

The pressure intensifier may be constituted by a double acting piston with an area ratio larger than one, for instance an area ratio about 1.3. In one embodiment the pressure intensifier comprises at least one cylinder unit accommodating a piston wherein the size of the first piston area is larger the size of the second piston area. The first piston area is exposed to the ambient pressure surrounding the system, and the second piston area is in contact directly or indirectly with the barrier fluid. The level of the ambient pressure used as an input to the pressure intensifier is multiplied by the arrangements of the first and second piston area thereby pressurizing the barrier fluid.

One or more pressure intensifiers may be included in the system. In one embodiment two pressure intensifiers are included in the system to make sure that sufficient expansion is provided in the retrieval process when bringing the system to the surface from the location of installation. In an operational sense it is advisable to include redundancy for the pressure intensifier.

The at least one pressure intensifier and the pre-charge arrangement are in fluid communication with the barrier fluid arrangement of the submersible installation. A check valve is provided to isolate the pre-charge arrangement from fluid communication with the barrier fluid arrangement when the pressure intensifier(s) delivers the predetermined differential pressure to the barrier fluid.

The invention also includes a method to pressurize the fluid barrier arrangement when submerging the system. During submerging of the system within a first initial depth interval, the pre-charged arrangement provides the predetermined differential pressure, when further submerging the system to the installation location, the pressure intensifier provides the predetermined differential pressure. When submerging the system deeper that the first initial depth interval, a check valve isolates the pre-charged arrangement.

Further the invention concerns a method to pressurize the fluid barrier arrangement of a submersible installation, when bringing the submersible installation from the installation location to the water surface, wherein the predetermined differential pressure is provided by the pressure intensifier.

An example of an embodiment of the invention will now be described with reference to the figures, wherein FIG. 1 shows an example of a prior art solution.

Figure 1:
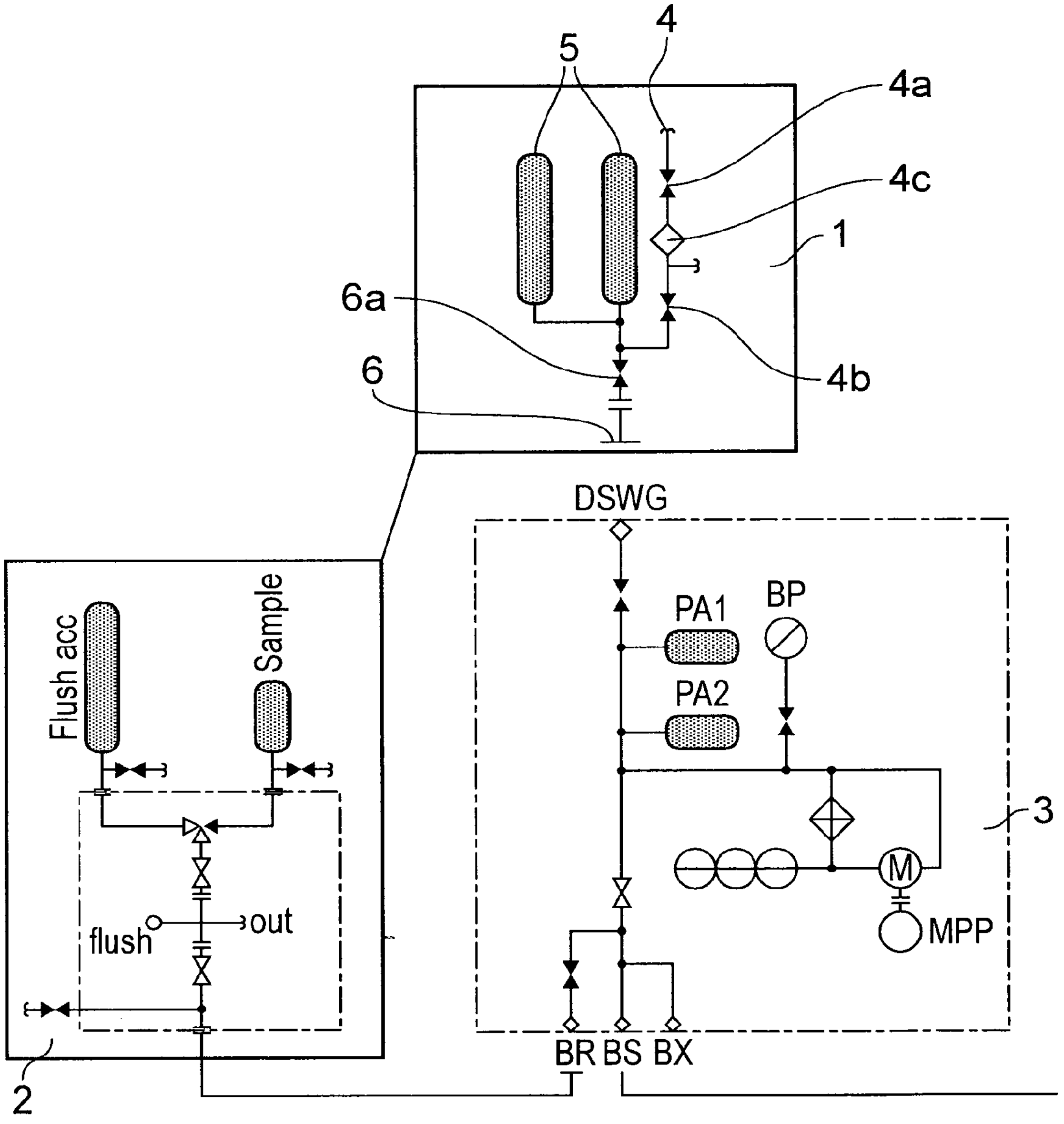

FIG. 1 sketches a fluid barrier filling system 1 which is connected to a fluid barrier system 2 of a submersible installation here shown as a subsea pump 3. The barrier filling system 1 is arranged with a pre charged arrangement here shown as two accumulators 5 arranged for supplying fluid to the fluid barrier system to make sure a pressure difference between the ambient pressure surrounding the subsea pump 3 and the barrier fluid is maintained. The barrier filling system 1 has a filling point 4 for the filling of barrier oil and the filling line is arranged with valve 4*a* for the filling of barrier fluid. Valve 4*a* and valve 4*b* are positioned on each side of a filter 4*c*. When replacing the filter 4*c*, the fluid flow is controlled by the valves 4*a*, 4*b*. The opening and the closing of the outlet valve 6*a* controls the communication of fluid from the fluid barrier filling system 1 into the fluid barrier system 2. The remaining components of the fluid barrier system 2 and the subsea pump 3 are not explained in detail here as these components are considered part of the prior art less relevant to the invention.

Figure 2:
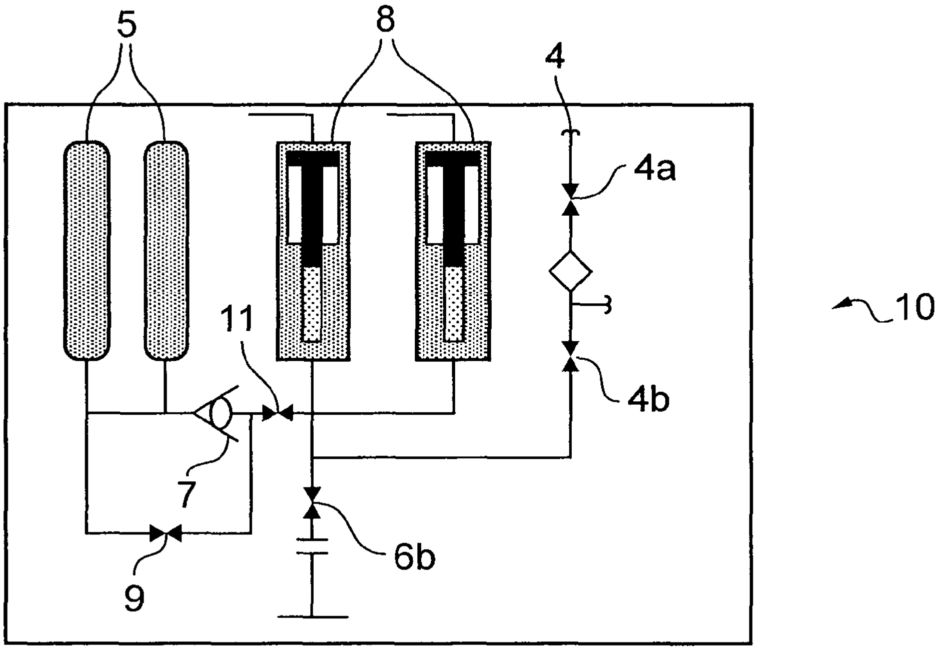
FIG. 2 shows an example of an embodiment of the invention.

As the arrangement of the accumulators work sufficiently only when being applied in a restricted depth interval, a barrier pressurising system 10 which is capable of providing the necessary pressure difference outside the working range of the accumulators is shown in FIG. 2. The differential pressure produced by the system fits within a predetermined differential pressure range acceptable to the system at all times.

The system 10 in the embodiment shown in FIG. 2 includes two accumulators 5 and two pressure intensifiers 8 arranged in parallel with the accumulators 5. The valves 4*a*, 4*b*, 6*b* in FIG. 2 have the same function as explained in connection with FIG. 1. The pressure intensifiers make use of the surrounding ambient pressure utilizing the area ratio between the piston surface facing the surrounding water pressure and the piston surface in contact with the barrier fluid to produce an overpressure in the barrier fluid. To be able to produce an overpressure in the barrier fluid, the ambient pressure needs to be at a certain level to get the pressure intensifiers 8 started. Thus the pressure intensifiers 8 are not capable of creating an overpressure in the barrier fluid, when the barrier pressurising system 10 is located at an initial depth interval during the submerging of the submersible installation, or the location of the submersible installation is restricted to the initial depth interval. In this initial depth interval the predetermined differential pressure is provided by fluid being supplied to the barrier fluid arrangement by the pre-charged accumulators 5.

To ensure satisfying working conditions for the pressure intensifier, the system may be provided rigid. The rigid system may be provided by a check valve 7 included in the barrier pressurising system 10 to isolate the accumulators and prevent the fluid supplied from the accumulators 5 from flowing back to the accumulators 5.

The temperature of the surroundings of the system 10 affects the temperature of the barrier fluid so that when the temperature of the surroundings decreases, the temperature of the barrier fluid decreases. Usually the barrier fluid is pressurized to a set barrier pressure before the system is being submerged into the water. When submerging the system into water having a relatively lower temperature than the surroundings of system prior to the submersion, the temperature change causes a reduction in the volume of the barrier fluid. The volume loss will be taken care of by the pre-charged accumulators which refill the barrier fluid arrangement, and the accumulators will compensate for the pressure loss due to the change in temperature. The volume loss due to the increasing pressure will also be taken care of by the accumulators. But this volume loss is minor as compared to the volume loss caused by the temperature reduction. When the system is installed and in operation, there is a loss of barrier fluid as the system consumes barrier fluid and due to reduction in volume caused by change in temperature, and the system therefore needs to be refilled. The pressure intensifier is therefore preferably designed with sufficient extra capacity for providing barrier fluid to replace the consumed barrier fluid for a certain period of time after installation of the system. Typically such a time period may be in the range of 50-60 hours.

When the system is installed, preferably means for refilling loss of barrier fluid is connected to the system. Such means for refilling the loss of barrier fluid, when the system is installed and in operation, may comprise an umbilical connected to the system.

When submerging the system 10 from the environment into the water with a relatively warmer temperature, the increase in temperature will cause a volumetric expansion of the barrier fluid. The accumulators will be prepared to meet this volume expansion by pre-charging of the accumulators to a pressure suitable for dealing with the temperature increase and the increasing ambient pressure.

The magnitude of the temperature change will depend on the lowering speed of the equipment, the initial temperature and the seawater temperature profile.

When the barrier pressurising system 10 reaches a depth corresponding to the ambient pressure necessary for the pressure intensifiers 8 to start working, i.e. the ambient pressure has reached the start-up pressure of the pressure intensifiers 8, the pressure intensifiers 8 handle the effects of temperature change and increasing pressure on the barrier fluid. A pressure difference is created over the piston areas over each pressure intensifier 8 to produce an overpressure in the barrier fluid. When pressure intensifier 8 starts working the check valve 7 makes sure the accumulators are shut off from delivering fluid to the barrier fluid arrangement. An additional valve 11 for isolation of the accumulators is provided to be used for initial tuning of the system and for pressurizing of the fluid pressure.

When the system 10 is to be retrieved from the location of installation, the system is exposed to changes in temperature which is smaller than the changes in temperature which the system experiences during installation. The system 10 is connected to the submersible installation, i.e. the subsea pump 3 at the installation location, the additional valve 11 is to be used for refilling fluid to the accumulators. The pressure intensifiers 8 supplies overpressure to the barrier fluid during the ascent of the pump 3 to the surface.

Usually the barrier fluid is bled, before the pump 3 is lifted out of the water, to avoid the effect of the surrounding temperature. The bleeding may for instance be carried out by opening the valve 9, bypassing the check valve 7, and relieving the system by communicating fluid to the accumulators 5. In one embodiment of the invention, the system is dimensioned having a capacity so that a hazardous pressure level of the barrier fluid is not reached even if the system is not bled when being lifted out of the water.

Figure 3:
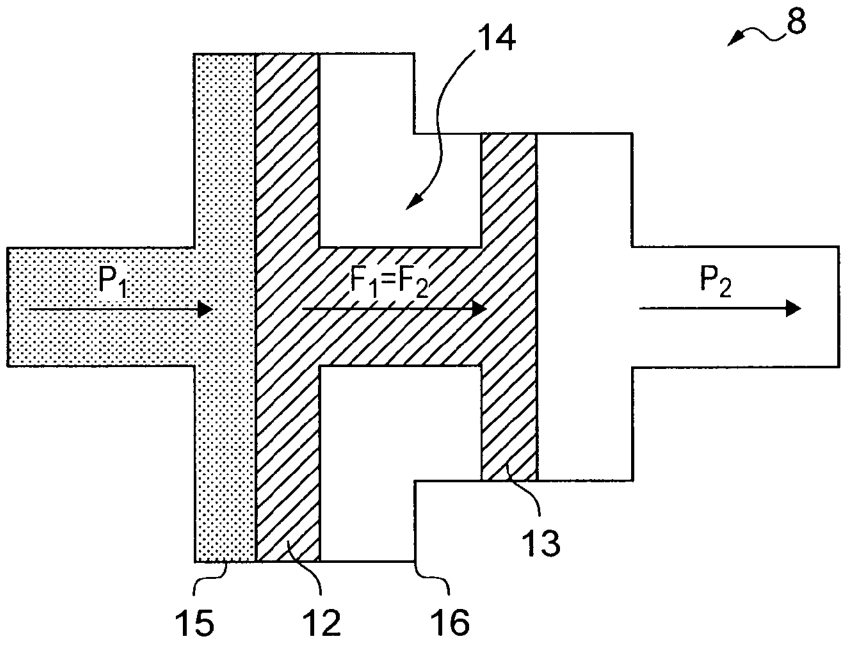
FIG. 3 shows an example of the pressure intensifier included in the invention.

FIG. 3 shows an example of an embodiment of the pressure intensifier 8. P1 illustrates the ambient pressure from the surroundings of the system, working on the first area of the double-acting piston 14. The second area 13 of the double-acting piston 14 is smaller that the first area 12 and hence the pressure P2 provided to barrier fluid is larger than the ambient pressure P1. The pressure produced by the pressure intensifier 8 is a function of the ambient pressure and the area ratio. The area ratio is dimensioned so that a pressure difference between the pressure of the barrier fluid and the ambient pressure at all times are higher than a predetermined level.

The area ratio of the double-acting piston 14 in FIG. 3 is dimensioned to about 1.3, but the pressure intensifier will also work sufficiently if the area ratio is different from 1.3, as long as the pressure intensifiers included in the system are capable of pressurizing the barrier fluid so that the produced differential pressure is kept within the predetermined differential pressure range.

The pressure intensifier 8 will of course work in reverse order during ascent and descent. The double-acting piston 14 will move in the direction from first end stop 15 to second end stop 16 during descent, and in the direction from second end stop 16 to first end stop 15 during ascent. During ascent the double-acting piston 14 must be placed in end position at second end stop 16 before connection of the system 10 to the subsea pump 3.

The invention claimed is:

1. A system to pressurize barrier fluid of a submersible installation to maintain a differential pressure between an ambient pressure surrounding the submersible installation and the pressure of the barrier fluid internally in the submersible installation during submersion of the system, wherein the differential pressure fits within a predetermined differential pressure range, the system comprising a pre-charge arrangement, wherein the system further comprises a pressure intensifier constructed to start working at a start-up pressure, and that the pre-charge arrangement, when the system is being submerged, provides said differential pressure until the ambient pressure equals the start up pressure of the pressure intensifier, and that the pressure intensifier is constructed to provide said differential pressure starting when the ambient pressure equals the start-up pressure of the pressure intensifier during further descent of the system and that the pressure intensifier works proportionally to the ambient pressure, and wherein a valve provides the pre-charge arrangement at said differential pressure until the ambient pressure equals the start up pressure and then isolates the pre-charge arrangement from the barrier fluid.

2. System in accordance with claim 1, wherein the pre-charge arrangement comprises at least one accumulator.

3. System in accordance claim 1, wherein the valve is a check valve provided to isolate the pre-charge arrangement.

4. System in accordance with claim 1, wherein the submersible installation is a subsea pump, subsea compressor or other equipment to be protected by the pressurizing of the barrier fluid.

5. System in accordance with claim 1, wherein the pressure intensifier comprises at least one cylinder unit accommodating a piston wherein the size of a first piston area is larger than the size of a second piston area.

6. System in accordance with claim 5, wherein the first piston area is exposed to the ambient pressure, and the second piston area is in contact with the barrier fluid.

7. Method for pressurizing a barrier fluid of a submersible installation to maintain a differential pressure between an ambient pressure surrounding the submersible installation and the pressure of the barrier fluid internally in the submersible installation, wherein the differential pressure fits within a predetermined differential pressure range, the method comprising:

providing the submersible installation with a pre-charge arrangement and a pressure intensifier;

wherein the pressure intensifier is constructed to start working at a start-up pressure providing the differential pressure with the pre-charged arrangement during submerging of the system within a first initial depth interval;

providing the differential pressure with the pressure intensifier when the ambient pressure equals the start-up pressure of the pressure intensifier during further submerging of the submersible installation to the installation location; and isolating the pre-charge arrangement from the barrier fluid with a valve when the system is submerged deeper than the first initial depth interval.

8. Method in accordance with claim 7, comprising letting the pressure intensifier provide the predetermined differential pressure when the submersible installation is brought from the installation location to the water surface.

9. Method in accordance with claim 7, wherein the submersible installation is a subsea pump, a subsea compressor or other equipment to be protected by the pressurizing of the barrier fluid.

10. Method in accordance with claim 7, wherein the valve comprises a check valve.

* * * * *